United States Patent [19]

Jørgensen

[11] Patent Number: 4,689,595
[45] Date of Patent: Aug. 25, 1987

[54] PTC STARTER FOR ASYNCHRONOUS MOTOR

[75] Inventor: Geert Jørgensen, Nordborg, Denmark

[73] Assignee: Danfoss A/S, Nordborg, Denmark

[21] Appl. No.: 893,956

[22] Filed: Aug. 7, 1986

[30] Foreign Application Priority Data

Aug. 6, 1985 [DE] Fed. Rep. of Germany ....... 3528141

[51] Int. Cl.$^4$ ...................... H01H 61/02; H01H 71/16
[52] U.S. Cl. .................................... 337/107; 337/102; 361/25; 361/105
[58] Field of Search ............... 337/102, 103, 104, 105, 337/106, 107; 361/105, 24, 25, 26

[56] References Cited

U.S. PATENT DOCUMENTS

| | | | |
|---|---|---|---|
| 4,319,299 | 3/1982 | Woods et al. ........................ | 361/105 |
| 4,646,195 | 2/1987 | Sauskas ................................ | 361/105 |

*Primary Examiner*—Harold Broome
*Attorney, Agent, or Firm*—Wayne B. Easton; Clayton R. Johnson

[57] ABSTRACT

A PTC starter that is electrically connected to an asynchronous motor by pins that extend through holes into the starter housing, which includes an open top, generally box shaped base portion and a cover having a downwardly opening recess mountable on the base portion. Support structure is provided in the base portion for loosely retaining a disc shaped PTC resistor and a pair of contact members on opposite sides of the resistor in a loose stacked relationship with the resistor, the support structure including a base portion receptacle for loosely retaining an electrical terminal bushing portion adjacent to a contact member. The cover in having its recessed portion moved downwardly along the contact members and resistor result in the contact members being resilient retained in electrical engagement with the resistor electrode surfaces, and at least two terminals extending upwardly through the cover. Advantageously the housing mounts a thermal protective switch for the motor.

9 Claims, 3 Drawing Figures

PTC STARTER FOR ASYNCHRONOUS MOTOR

The invention relates to a PTC starter for an asynchronous motor, comprising a two-part housing of which the base portion has holes for the passage of pins leading to the motor and the cover portion has a depression with opposed pressure faces, a disc-like PTC resistor and, lying against both sides thereof, sheet metal contact plates arranged as stacks in the depression, the pressure faces acting on resilient sheet metal tongues formed on the contact plates, bushings disposed behind the holes of the base portion, two of the bushings being electrically connected to the contact plates, external terminals projecting from the housing, and possibly a receiving aperture for a thermal protection switch.

Such a starter is designed particularly for the drive motor of a hermetically encapsulated refrigerator and is placed on throughgoing pins which pass through the wall of the caspsule. With the aid of the PTC resistor, the auxiliary winding of the asynchronous motor is made inoperative after a certain starting period. The thermal protection switch faces the wall of the capsule and switches the motor off if the capsule reaches an excess temperature.

In a known starter of this kind (DE-OS No. 22 26 174), the depression of the cover portion is so large that it completely accommodates the stack consisting of the PTC resistor and contact faces. Additional depressions in the cover portion serve to receive the bushings and the external terminals projecting out of the housing. The base portion merely consists of a plate provided with the holes and a rib. The contact plates comprise guides which are formed with the aid of pressed-out sheet metal bridges for inserting sheet metal strips carrying the bushings or external terminals.

If, during assembly, the disc-like PTC resistor and the two contact plates are introduced in the depression, relative movement between the end of the resistor and the contact plate lying there against is practically unavoidable. This can damage the electrode applied to the end of the resistor disc, especially by being vapourised thereon, and can therefore detrimentally influence the operational reliability of the resistor element. In addition, assembly is difficult because the individual parts have to be pushed into each other with a very close fit. Automatic assembly is practically impossible.

The invention is based on the problem of providing a PTC starter of the aforementioned kind in which damage of the elctrodes at the ends of the disc-like PTC resistor is avoided during assembly and pushing in takes place with such a degree of play that fully automatic assembly is also possible.

This problem is solved according to the invention in that the base portion comprises holders adapted to hold the PTC resistor and the two contact plates as a loose stack during assembly of the cover portion.

In this construction, the base portion is so formed that it receives the PTC resistor and the two contact plates with a large amount of play. They can therefore also be inserted fully automatically. It is only when the cover portion is placed on, which can again be performed fully automatically, that the parts forming the stack are pushed together under the influence of the pressure faces acting on the resilient sheet metal tongues and are brought into the desired position. Since the parts of the stack are supported on the base portion, there is no relative displacement in the plane of the disc. The electrode surfaces of the PTC resistor can therefore not be damaged.

In a particularly simple embodiment, the holders are formed by webs upstanding from the base surface. They can be formed without difficulties during formation of the base portion, for example by injection moulding.

For example, two parallel longitudinal webs may be provided for receiving each contact plate.

To support the PTC resistor, at least one longitudinal web should have a supporting edge corresponding to the curvature of the disc circumference. In this case, it is recommended that the disc be supported over at least substantially half its diameter by three parallel longitudinal webs. When the contact plates have first been brought to their positions, the disc can be securely placed on the said longitudinal webs between the contact plates.

It is also favourable for each contact plate to extend between an upstanding edge of the base portion and a transverse web. This also fixes the position of the contact plate in the longitudinal direction.

Another additional possibility for securing the position of the contact plate is for the latter to engage through a slot in at least one transverse web.

In a preferred embodiment, receptacles for loosely receiving the bushings are provided behind the holes in the base portion. The bushings can therefore also be brought into position by simply throwing them into the receptacles. This is likewise possible fully automatically.

Advantageously, each contact plate comprises an extension engaging in a receptacle and there making contact with a bushing. Contacting can be achieved by the extension carrying a resilient lug projecting into the bushing from the edge on the base side. The lug will be securely pressed against the bushing upon introduction of the pin leading to the motor.

In this way, it is possible to separate the bushings and contact plates. They can therefore be made from different materials. In particular, the bushings may be of thicker sheet metal than the contact plates. This first of all takes into account the heavier loading of the bushings during operation and on the other hand makes it possible for the resilient sheet metal tongues that co-operate with the pressure faces to be more elastic than is possible with thicker metal.

Further, at least one bushing may be made in one piece with a plug which projects through an aperture in the other portion as an external terminal. Since this external terminal is then partly held in the receptacle and partly in the aperture, it is adequately supported.

It is also favourable if a bushing which is not connected to the contact plates and a clamp projecting into the receiving aperture for the thermal protection switch are integrally connected by way of a sheet metal section which lies on a supporting wall of the base portion and is held down by an oblique surface of the cover portion. This bushing is likewise securely held on the supporting wall by the arrangement of the receptacle and by the locking means.

Additional advantages are brought about if at least one external terminal engages through a side wall of the depression and, at the inside, defines a pressure face. Since the pressure face co-operates with the resilient sheet metal tongue, there will be a reliable electrical connection between the external terminal and the contact plate.

In this case it is advisable for the external terminal to be formed by a sheet metal strip which is flanged twice, has a central section extending between a short inner limb and a longer outer limb, can be pushed into two transverse guides of the cover portion and latches with a latching lug in the cover portion. This external terminal can then likewise be assembled fully automatically. It need merely be placed in the transverse guides and pushed in until it latches.

Assembly is simplified still further in that the depression and/or the aperture for the plugs are provided with guide chamfers in the cover portion. These chamfers compensate for inaccurate positions caused by the large amount of play.

Part of the holders in the base portion can likewise be provided with guide chamfers. They facilitate introduction of the individual elements even if tolerances have to be taken into account during application.

Preferably, the base portion and cover portion are interconnected by a snap connection. The stack parts are pressed together by one and the same relative motion as the cover is applied, all the other parts are fixed in position and the base and cover portions are interconnected.

A preferred example will now be described in more detail with reference to the drawing, in which.

Figure 1:
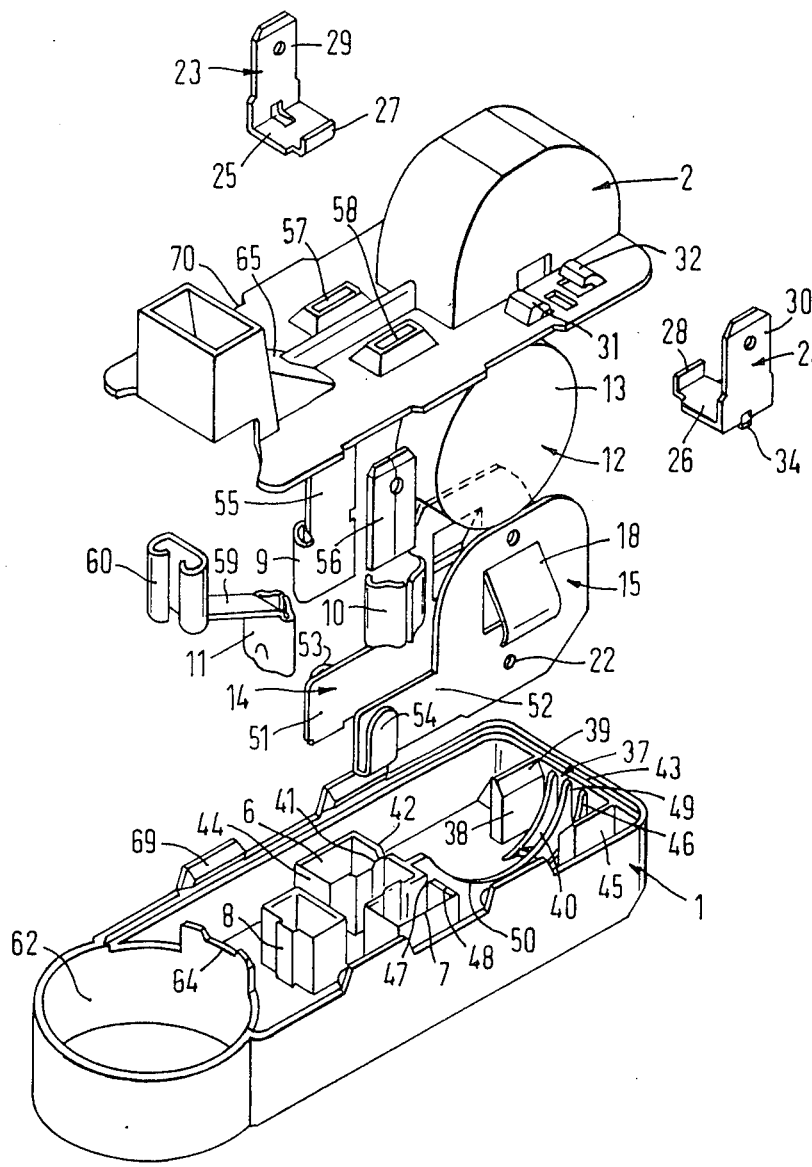
FIG. 1 is an exploded view of the PTC starter.
Figure 2:
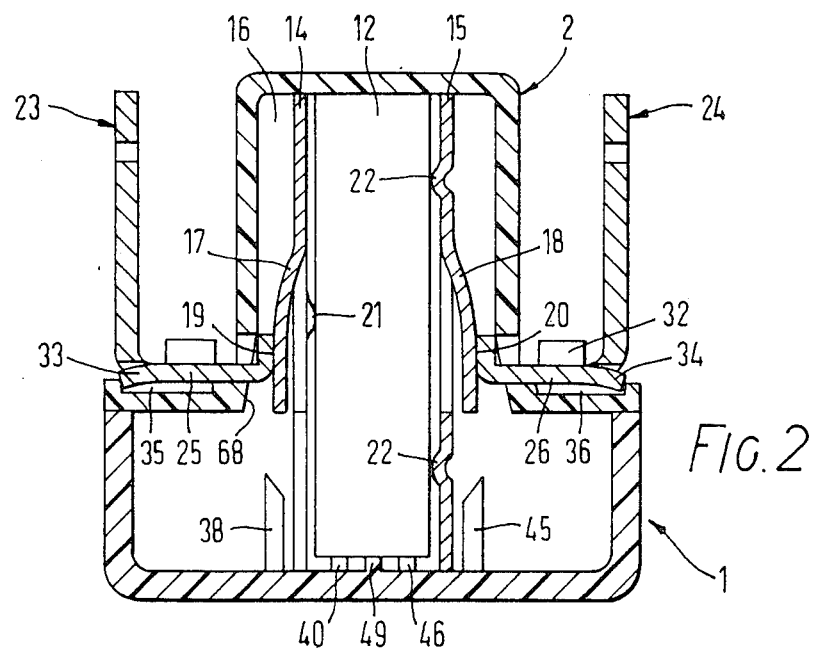
FIG. 2 is a cross-section through the housing in the region of the disc-like PTC resistor.
Figure 3:
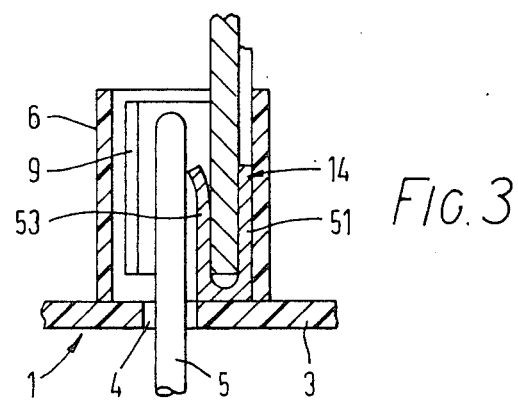
FIG. 3 is a partial cross-section through the housing in the region of a receptacle.

The illustrated starter comprises a housing composed of a base portion 1 and a cover portion 2. In the base 3 of the base portion 1 there are three holes 4 through which there can engage pins 5 connected to an asynchronous motor. Each hole 4 is surrounded by a receptacle 6, 7 or 8 and loosely receives a bushing 9, 10 or 11, respectively.

A disc-like PTC resistor 12 with ends 13 having vapourised-on electrodes form, together with contact plates 14 and 15 on both sides, a stack which is inserted in a depression 16 of the cover portion 2. Both contact plates each have a resilient sheet metal tongue 17 or 18 bent out of the plane of the sheet metal and engaging a pressure face 19 or 20 connected to the cover portion. In this way, the contact plates are pressed against the electrodes of the PTC resistor 12 by contact projections 21 or 22.

Two external terminals 23 and 24 are formed by sheet metal strips which are flanged twice, and have several sections 25 or 26 extending between a short inner limb 27 or 28 and a longer outer limb 29 or 30. The inner limbs define the pressure faces 19 or 20. The central limbs can each be pushed into two transverse guides 31 and 32 of the cover portion 2. They each have a latching lug 33 or 34 with which they latch into a depression 35 or 36 of the cover portion.

The base portion 1 comprises holders 37 which are adapted to hold the PTC resistor 12 and the two contact faces 14 and 15 as a loose stack during assembly of the cover portion 2. The contact plate 14 is received between a first longitudinal web 38 having an oblique guide surface 39 and a second longitudinal web 40 and also in a slot 41 of a transverse web 42. The position in the longitudinal direction is determined by the upstanding edge 43 and a further transverse wall 44 of the receptacle 6. Similarly, the contact plate 15 is held between two longitudinal webs 45 and 46 and in the slot 47. The two longitudinal webs 40 and 46 as well as a further longitudinal web 49 have supporting edges 50 corresponding to the curvature of the disc circumference of the PTC resistor 12.

The contact faces 14 and 15 each possess an extension 51 or 52 with which they project into the receptacles 6 or 7. They are there provided with a resilient lug 53 or 54 which projects into the bushing 9 from the edge on the base side. Upon introducing the pin 5, the resilient lug 53 is pressed against the central portion of the bushing under the influence of the spring force of the bushing 9 to result in a good electrical contact.

Each bushing 9 and 10 is provided with a plug 55 or 56 which projects outwardly through apertures 57 or 58 of the cover portion 2 and therefor forms an external terminal. At the same time, this fixes the position of these bushings.

The bushing 11 is connected by way of a sheet metal section 59 to a clamp 60 which, upon insertion of a motor protection switch 61 in a corresponding receiving aperture 62, comes into contact with the terminal 63 of this protection switch. The sheet metal strip 59 lies on a supporting wall 64 of the base portion 1 and is held down by an oblique surface 65 of the cover portion. The other two terminals 66 and 67 can be employed for connecting the connecting apparatus to the one pole of the voltage source whereas one of the external terminals is connected to the other pole. The remaining external terminals permit other auxiliary equipment to be connected, e.g. a condenser.

Assembly takes place in the following manner. First, the two contact plates 14 and 15 are inserted in the holder 37. The disc of the PTC resistor 12 is then placed between the connecting plates. Finally, the three bushings 9, 10, 11 are inserted in the appropriate receptacles 6, 7 and 8. The two external terminals 23 and 24 were pushed into the guides of the cover portion 22 from the side until the latching lugs 33 and 34 have latched in the depressions 35 and 36. The cover portion is then pushed over the base portion from above. Oblique guide surfaces 68 on the depression 16 and corresponding guide surfaces on the apertures 57 and 58 ensure that the parts loosely collected in the base portion 1 safely reach the depression 16 or through the apertures 57 and 58. As soon as the pressure faces 19 and 20 come into contact with the resilient sheet metal tongues 17 and 18, the contact plates 14 and 15 are pressed against the PTC resistor 12. Since this supports the three said parts of the plug against the base portion, there is merely transverse movement of the parts relatively to each other but no longitudinal displacement that could damage the electrodes of the resistor. Towards the end of the placing on proceedure, holder projections 69 on the base portion 1 snap over edges 70 on the cover portion 2, whereupon the apparatus is practically assembled. All these assembly steps can be performed fully automatically.

Reliable electrical contacting between the contact faces 14, 15 and the bushings 9, 10 is achieved only after the pins 5 have been pushed into the bushings.

Many changes can be made to the described construction without departing from the basic concept of the invention. For example, the external terminals 23 and 24 can be dispensed with if the parallel external terminals 55 and 56 are sufficient. In this case, the side walls of the depression 16 would serve as pressure faces. Instead of the illustrated webs for holding the stack components, it is also possible to employ columns or additional slots. The cover portion and base portion can also be secured together in a manner different from a snap connection, for example by screws or rivets.

I claim:

1. A PTC starter for operatively receiving pins of an asynchronous motor unit, comprising, a housing that includes a generally box shaped, open top base portion that has a bottom wall and a base interior and a cover mountable on the base portion for closing the base portion and ahving wall means defining a downwardly opening recess that opens toward the bottom wall, said wall means including transversely spaced first and second wall portions, a disc-like PTC resistor that has opposite first and second electrode surface portions which in part extend into the recess between said wall portions and in part into the base portion interior, first and second electric contact means that at least in part extend into the base portion interior and in part into the recess respectively between the first wall portion and the first surface portion, and the second wall portion and the second wall portion and the second surface portion, each contact means including a main body portion in abuttable electrical contact with the adjacent suface portion and retaining means in engagement with the housing and extending away from the adjacent surface portion and the main body portion for resiliently retaining the respective body portion in electrical contact with the adjacent surface portion when the cover is mounted on the base portion, the transverse dimensions of the main body portions and the resistor being substantially less then the corresponding transverse dimension between said wall portions, and a plurality of electrical terminal means extending exterior of the housing and into the base portion interior, each terminal means having an exterior terminal portion and a bushing in the base portion interior for each contact means for placing the respective contact means in electrical contact with one of the exterior terminal portion, the base portion having holding means for supporting the contact means and resistor in a loosely transversely stacked relationship prior to the cover being mounted on the base portion.

2. A starter according to claim 1, characterized in that the base portion includes a receptacle within the base interior and joined to the bottom wall and that there is provided a thermal motor protection switch that has an electric terminal, the base portion having means for mounting the motor switch, a bushing located in said receptacle, said bottom wall having a hole opening to the receptacle to have a pin extended therethrough, a clamp member in electric contact with the terminal and metal means for electrically connecting the clamp means to the bushing, the cover having wall means for engaging the metal means to hold the metal means in engagement with the base portion.

3. A starter according to claim 1, characterized in that the terminal means includes an external terminal that has a web portion extending through one of the wall portions, a shor leg within the recess, abutting against one wall portion and the adjacent contact means and joined to the web portion, and an external leg of a greater length than the short leg that is joined to the web portion, and that guides are provided on the cover to facilitate mounting the external terminal and retaining it in a mounted position on the cover.

4. A starter according to claim 1 characterized in that the holding means comprises base portion web parts joined to the bottom wall to extend thereabove for supporting the resistor in a given longitudinal position and permitting limited transverse movement of the resistor and main body portions prior to mounting of the cover on the base portion.

5. A starter accoring to claim 4, characterized in that each main body portion has a generally plate shaped part and that the web parts includes a pair of transverse space web portions for each plate shaped part to retain the respective plate shaped part in a generally upright condition and are of substantially greater transverse spacing than the corresponding dimension of the respective plate shaped part to permit limited transverse movement prior to the cover being mounted on the base portion.

6. A starter according to claim 1, characterized in that the base portion includes a receptacle for each terminal means that is joined to the bottom wall to extend thereabove, and loosely retain one of the bushings therein, and that a hole for each pin is provided in the housing and opens to the respective receptacle.

7. A starter according to claim 6, characterized in that each main body portion comprises a generally plate shaped part for electrically engaging the adjacent electrode surface portion, each plate shaped portion part having an extension, that the terminal means includes a first and second terminal, that the bushings includes a first and a second bushing for the first and second terminals respectively, and that the receptacle for each terminal means includes a first and a second receptacle joined to the bottom wall to extend therebetween and have the first and second terminal loosely located therein, the first and second receptacle having the extension of the first and second contact means respectively extended thereinto, and that the first and second contact means includes a resilient lug portion that is joined to the respective extension and adapted for engaging a pin and when engaged by a pin, is pressed firmly against the adjacent bushing to provide a good electrical contact.

8. A starter according to claim 7, characterized in that each lug extends into the adjacent bushing and is joined to the respective extension adjacent to the bottom wall with the bushing in part being between the juncture of the lug to the extension and the cover.

9. A starter according to claim 1, characterized in that the resistor has a circular cylindrical surface extending between said electrode surface portions, and that the holder means comprises a longitudinal web joined to the bottom wall and extending thereabove, the web having a supporting edge for abutting against the circular surface over at least substantially half of the diameter of the circular surface.

* * * * *